Sept. 22, 1931.  C. D. BULLARD  1,824,072
AUTOMATIC SAFETY VALVE
Filed Sept. 22, 1930

Inventor
C. D. Bullard
By Wilkinson & Mawhinney
Attorneys

Patented Sept. 22, 1931

1,824,072

UNITED STATES PATENT OFFICE

CHIPLEY D. BULLARD, OF NEW ORLEANS, LOUISIANA

AUTOMATIC SAFETY VALVE

Application filed September 22, 1930. Serial No. 483,692.

The present invention relates to improvements in automatic safety valves and has for an object to provide an improved valve adapted to shut-off automatically on fall in pressure whereby escaping gas or other noxious and harmful fluids will be prevented from subsequently passing through the valve.

Another object of the invention is to produce a simple and economical form of valve and combined shut-off in which, after closing, the valve will be locked against opening except when released by hand.

With the foregoing and other objects in view, the invention will be more fully described hereinafter, and will be more particularly pointed out in the claim appended hereto.

In the drawings, wherein like symbols refer to like or corresponding parts throughout the several views.

Figure 1:
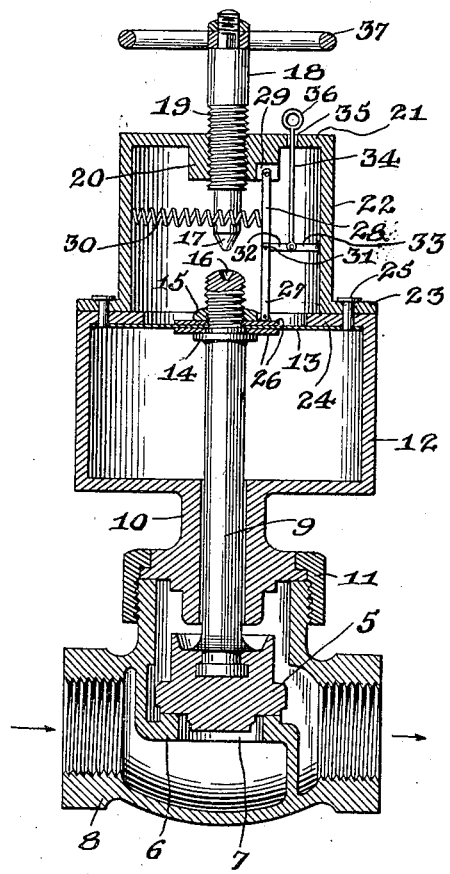
Figure 1 is a vertical section taken through an improved shut-off valve constructed according to the present invention and with the parts in closed position.

Referring more particularly to the drawings, 5 represents a disc or other type of valve adapted to close against the valve seat 6 formed in a diaphragm having a port 7 through which the gas or other material passes in the direction indicated by the arrow from a source of supply at the left of the valve body 8.

The valve 5 is carried upon a stem 9 which has loose play through a neck 10 which is secured, as by a bonnet nut 11, to the valve body and supports the lower diaphragm case 12. In this case is supported a flexible diaphragm 13 which is coupled to the stem 9 as by the use of a collar 14 and a nut 15 threaded upon such stem 9. In the upper end of the stem is a socket 16 for receiving the conical nose 17 of an adjusting member 18 which is threaded as indicated at 19 and threadedly engages through an inwardly extending boss 20 upon the closed top 21 of the upper diaphragm case 22.

The latter case 22 is provided with an outturned flange 23 at its lower open to mate with an in-turned flange 24 at the upper open end of the lower case 12. The two flanges may be secured together by rivets or other appropriate fastenings 25, which may serve the further purpose of holding the diaphragm 13 in place.

Between the shoulder 14 and nut 15 there may be provided washers or plates 26 for embracing opposite sides of the diaphragm 13 and to one of these washers or to the nut 15 or other part moving with the diaphragm is pivotally secured one member 27 of a toggle lever. The upper toggle member 28 is of course pivoted to the upper end of the lower toggle member 27. Such upper toggle member 28 is received at its upper end within a recess 29 of the boss 20, and it is pivoted to such boss within the recess. A light coil spring 30 is coupled between the toggle member 28 just above the intermediate joint 31 and a wall of the upper diaphragm case 22.

The toggle joint or lever 27, 28 constitutes a locking device, and a second toggle, composed of the members 32 and 33, is provided for opening and closing the locking toggle joint. The member 32 of the release toggle is coupled at one end to the pivotal point 31 of the locking toggle and at its other end both to the companion toggle member 33 and to an operating rod 34 that extends up through an opening 35 in the top 21 of the upper diaphragm case 22.

A ring or other manipulating handle 36 is provided upon the exterior end of the rod 34 beneath the hand wheel 37 for operating the screw adjusting rod 18. The other end of the toggle member 33 is pivoted to the case 22.

Figure 2:
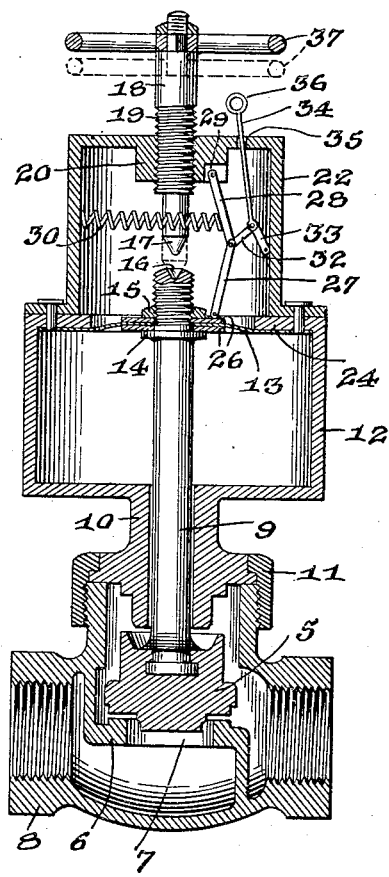
Figure 2 is a similar view with the parts in the open position.

In the operation of the device, gas or other fluid will flow through the valve body 8 in the direction indicated by the arrow toward gas burners or other destination. When the valve is open, as indicated in Figure 2, the gas will ascend up about the valve 5 and will pass up through the neck 10 into the lower diaphragm case 12 so that the diaphragm case 13 will be subjected to the fluid pressure, which will tend to maintain the diaphragm and valve in the raised position so long as the pressure obtains.

Should the pressure fall for any reason, which fall in pressure would be attended by the extinguishing of gas burners, then upon subsequent re-establishment of pressure, the valve 5 would ordinarily be opened and the gas would be permitted to flow to the burners and escape into the surrounding room causing noxious odors, and probably asphyxiating those present.

The improved safety device will effectually lock the valve 5 in the closed position should any such reduction in pressure occur as to extinguish the burners and thus prevent a re-establishment of pressure operating to open the valve 5. When the diaphragm 13 and the valve 5 are in the closed position, as indicated in Figure 1, the toggle lock 27, 28 will assume the vertical position in which the members are in alignment. The light spring 30 will tend to move the parts to this position.

Moreover, the operating toggle 32, 33 is also in a locked condition and will tend to prevent the diaphragm 13 from rising and the valve 5 from opening until such time as the toggle lock is broken by manually grasping and raising the rod 34. The pulling up of the rod 34 will break the toggle 32, 33 and at the same time also break the locking toggle 27, 28, raising the valve 5 from its seat and permitting the establishment of pressure below the diaphragm 13 such as will hold the parts in the open position until an unlooked for reduction in pressure occurs.

When the spring 30 is in the position shown in Figure 2 it is slightly stretched but the tension is not sufficient to overcome the gas pressure below the diaphragm 13. The action of the central spring 30 tends to straighten the toggle.

The valve 5 may be closed by rotating the hand wheel 37. The closing of the valve through the hand wheel also acts to close the locking toggle. The locking toggle will of course hold the valve closed when the adjusting member 18 is released. This member 18 may also act to adjust the degree or port area to which the valve 5 may open.

It will be appreciated that the device may be used in connection with various gases, fluids and also perhaps some solids, such as flour, etc.

It is obvious that various changes and modifications may be made in the details of construction and design of the above specifically described embodiment of this invention without departing from the spirit thereof, such changes and modifications being restricted only by the scope of the following claim:

What is claimed is:—

In combination with a movable valve, a diaphragm secured to move therewith and subject to the pressure of the fluid flowing past said valve, a toggle joint secured to said diaphragm and to a fixed part and adapted to lock the valve in the closed position, a light spring connected to said locking toggle and a fixed part for tending to move the toggle into locked position, an operating toggle extending at substantially right angles to the first mentioned toggle and connected thereto at its central pivotal point and to a fixed part, and an operating rod connected to the intermediate pivot point of the operating toggle.

CHIPLEY D. BULLARD.